United States Patent [19]

Hutter et al.

[11] Patent Number: 5,174,541
[45] Date of Patent: Dec. 29, 1992

[54] ROTATABLE TRANSMISSION MOUNT

[75] Inventors: Robert B. Hutter, Livonia; Thomas T. Peacy, Berkley, both of Mich.

[73] Assignee: Chrysler Corporation, Highland Park, Mich.

[21] Appl. No.: 710,865

[22] Filed: Jun. 6, 1991

[51] Int. Cl.⁵ ............................................. F16M 13/00
[52] U.S. Cl. ................................. 248/636; 180/312; 267/141.4
[58] Field of Search ............... 248/634, 635, 609, 659, 248/632, 633, 636, 638; 267/141.4, 141.5, 257, 258, 292, 294, 141; 180/312

[56] References Cited

U.S. PATENT DOCUMENTS

| | | | |
|---|---|---|---|
| 1,476,355 | 12/1923 | Borst | 267/258 |
| 2,263,521 | 11/1941 | Schieferstein | 267/282 |
| 2,915,306 | 12/1959 | Hickman | 267/281 X |
| 3,139,250 | 6/1964 | Turlay | 267/141.4 X |
| 3,548,964 | 12/1970 | Krauss | 248/634 X |
| 3,881,772 | 5/1975 | Mohrman | 248/609 X |
| 4,660,797 | 4/1987 | Tonnies | 267/279 X |
| 4,809,799 | 3/1989 | Ozaki | 180/312 X |
| 5,074,374 | 12/1991 | Ohtake | 180/312 |
| 5,101,928 | 4/1992 | O'Connor | 180/312 X |

Primary Examiner—J. Franklin Foss
Attorney, Agent, or Firm—Kenneth H. MacLean

[57] ABSTRACT

A mounting device with two attachment portions, one connected to a transmission portion of an engine/transmission assembly and another connected to a frame member of a vehicle in which the attachment portions rotate relative to one another about an axis normal to a plane of engine/transmission angulation during assembly thereof to the vehicle and during subsequent operation of the vehicle. A stationary cylindrically tubular sleeve encircles a rubber isolator which can rotate in the sleeve. One of the attachment portions of the mounting device is connected to the rubber isolator and rotates with it whereby the angular position of the engine/transmission is varied with respect to the vehicle.

5 Claims, 2 Drawing Sheets

ROTATABLE TRANSMISSION MOUNT

BACKGROUND OF THE INVENTION

1. Field of Invention

A mount to attach the transmission end portion of an engine/transmission assembly to a vehicle framing member so that angular variations between the engine/transmission and the frame are accomodated.

2. Description of the Related Art

Various designs of mounting devices for engine/transmissions are known in the prior art. An example of such a mount is found in U.S. Pat. No. 2,039,007 to Keller, issued Apr. 28, 1936. The Keller device uses rubber members as isolators to inhibit transmission of vibrations and the like to the vehicle.

Use of rubber isolators to dampen vibrations is well known in the prior art. In U.S. Pat. No. 4,770,398 a non-symetrical rubber member captured between two rigid members is disclosed in an engine mount. Disclosed in U.S. Pat. No. 4,767,108 to Tanaka, issued Aug. 30, 1988, is an elastic bushing including a rubber member captured between metal portions.

Rubber isolators are disclosed in the following U.S. Pat. Nos.: 3,331,642 to Krauss; 4,401,198 to Kunczynski; 4,588,174 to Konishi; 4,700,934 to Andra; and 4,809,960 to Kakimoto.

SUMMARY OF THE INVENTION

The subject engine/transmission mount includes a pair of brackets, a first bracket for attachment to a transmission portion of an engine/transmission assembly and a second bracket for attachment to a vehicle framing member. The first bracket is integrally connected to a cylindrical rubber isolator which itself is captured within a cylindrically tubular sleeve attached to the second bracket. This arrangement permits the rubber isolator and first bracket to rotate relative to the second bracket and tubular sleeve. Resultantly, angular variations betweeen the engine/transmission assembly and the vehicle frame both during and after assembly are accomodated.

Other advantageous features of the subject engine/transmission mounting device will be more readily apparent after a reading of the following detailed description of a preferred embodiment and with reference to the drawings of the embodiment as described hereafter.

IN THE DRAWINGS

FIG. 1 is a perspective view of an engine/transmission assembly and a portion of a vehicle cross frame member with the parts separated and the subject mounting device located therebetween; and FIG. 2 is an end sectional view of the mounting device shown in FIG. 1 looking in the vehicle's lateral direction and with the mount attached to the transmission and vehicle frame; and FIG. 3 is a top planar view of the mount; and FIG. 4 is an end sectional view of the mount taken along section line 4—4 in FIG. 3 and looking in the direction of the arrows.

DETAILED DESCRIPTION OF AN EMBODIMENT

Figure 1:
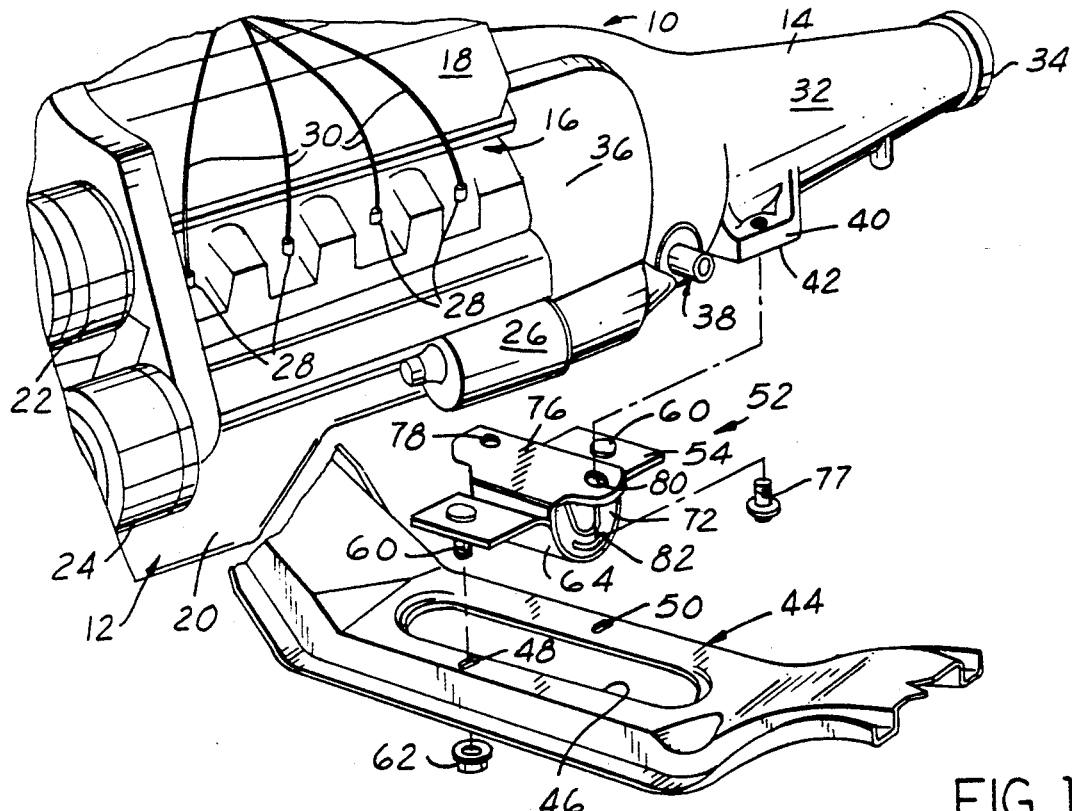

In FIG. 1, a portion of a vehile powertrain or engine/transmission assembly 10 is illustrated. More specifically, the view shows most of an internal combustion engine 12 and a transmission 14 fastened together in the usual manner to form an elongated powertrain assembly. The engine/transmission can be mounted in a vehicle in a North-South orientation, particularly popular for rear wheel drive vehicles but also used for some front wheel drive vehicles. In other words, this means that the engine/transmission assembly has its elongated orientation (parallel to the crankshaft and main shafts of the transmission) in the longitudinal direction of the vehicle (front to back). Portions of the engine shown in FIG. 1 include: a cylinder head 16; a valve cover 18; an oil pan 20; assesories 22, 24 (alternator, power steering pump); a starter motor assembly 26; and spark plugs 28 and ignition wires 30.

The transmission portion 1 of the engine/transmission assembly includes: the transmission case or housing 32 with a rear output end portion 34 and a forward input portion 36. The forward input portion 36 is shown attached to the rear (output) end portion of the engine 12 (by fasteners as is customary). Also shown is a speedometer tap 38. The housing 32 of the transmission has a boss portion 40 defining a downwardly facing flat surface 42 which extends across housing 32 in the direction normal to the axis of the engine crankshaft and transmission shafts.

In FIG. 1, the engine/transmission 10 is shown in an "exploded" or unassembled relationship to a vehicle's cross frame support member 44. The frame member 44 extends laterally across the associated vehicle while the elongated engine/transmission 10 extends in the vehicle's longitudinal direction. The frame member 44 has a central opening 46 therethrough which extends laterally with respect to the elongated engine/transmission. Spaced in front and to the rear of opening 46 are fastener openings 48, 50 respectively.

Figure 3:
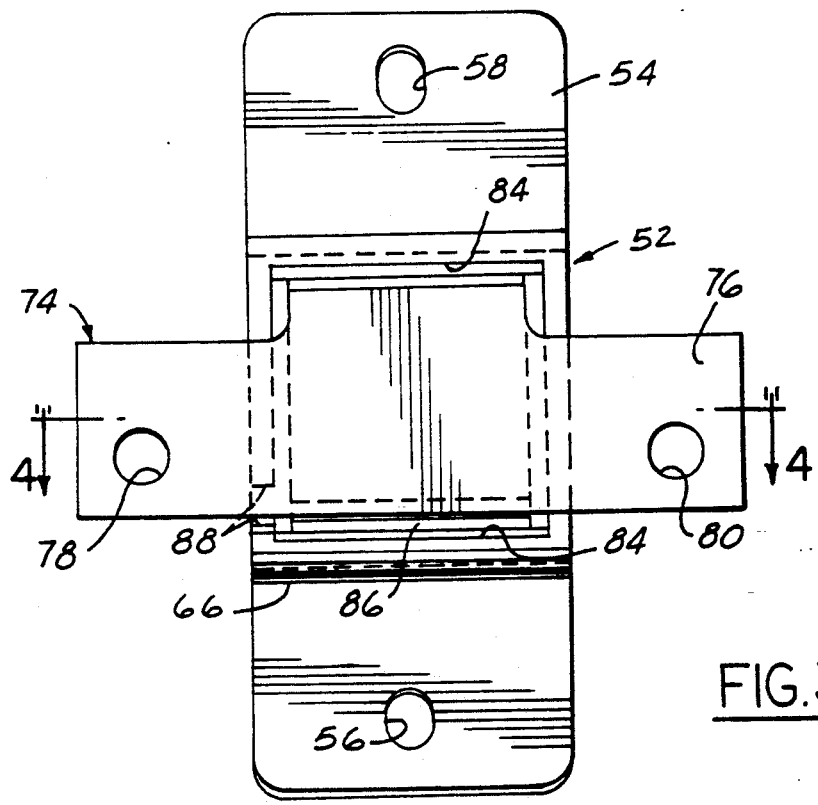
Figure 2:
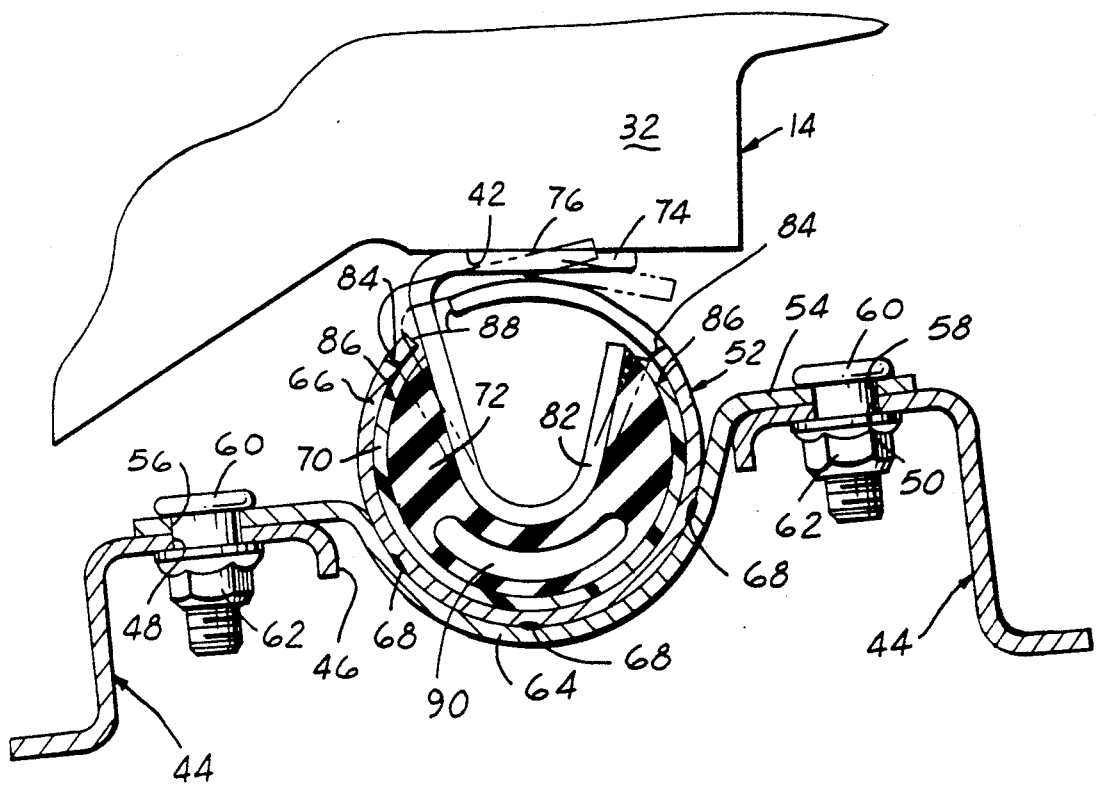
Figure 4:
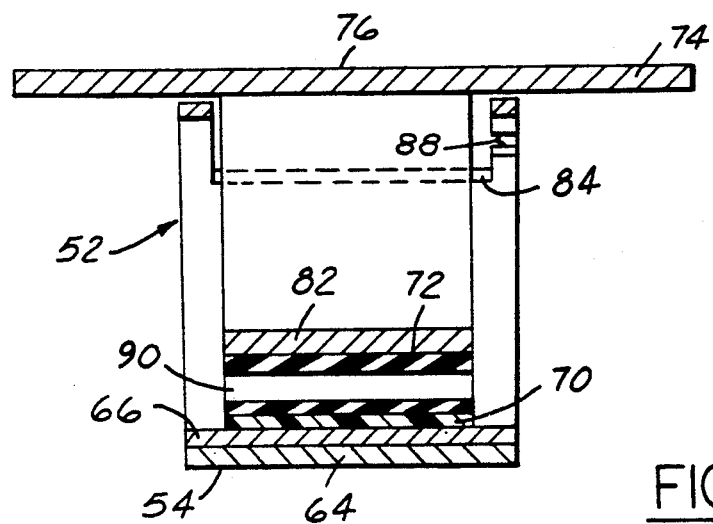

The transmission portion 14 is supported by the cross frame member 44 and specifically by a mounting device 52. Details of the construction of the device 52 are shown in FIGS. 2-4. Device 52 includes a frame bracket portion 54 in the form of an elongated strap-like member with a forward opening 56 and a rearward opening 58 piercing its end opposite end portions. The openings 56, 58 are spaced to be aligned with the openings 48, 50 respectively, in the cross frame member 44 when the bracket 54 is laid on top of the frame member. The bracket 54 is adapted to be fastened to frame member 44 by bolt 60 and nut 62 fasteners extending through the aligned openings 48, 56 and 50, 58 respectively.

The frame bracket 54 has a semi-cylindrically configured midportion 64 adapted to depend into the opening 46. The midportion 64 supports a cylindrically tubular sleeve member 66 which is attached to the midportion by welds 68. An inner sleeve member 70 of anti-friction material extends against the inner surface of tubular sleeve 66. A rubber vibration isolator member 72 with a generally cylindrical shape is supported within the sleeves 66, 70. Rubber member 72 is generally free to rotate in the tubular sleeve 66 about its axis which extends laterally with respect to the vehicle and thus normal to the longitudinal dimension of the vehicle. it can be understood that the thin inner sleeve 70 is designed to reduce friction between the tubular sleeve 66 and the rotatable rubber member 72.

As best illustrated in FIG. 2, an elongated transmission supporting bracket portion 74 extends into the rubber member 72. Bracket 74 has an elongated upper portion defining upper surface 76 which is adapted to bear up against transmission surface 42. The surface 76 is held against surface 42 by fasteners 77 (only one of two fasteners shown in FIG. 1). The fasteners 77 are adapted to extend through openings 78, 80 in opposite end of the bracket member 74.

Specifically, the bracket member 74 has a midportion 82 with a leg 82' portion depending from the upper portion and further including portions 82" extending upward toward the main body 74. In FIG. 2, the midportion 82 is generally in a U-shape configuration although other configurations are possible. The midportion 82 is attached to the rubber member 72 by molding the rubber about its surface. Resultantly, bracket member 74 and the rubber isolator 72 rotate together relative to the sleeve 66 and frame bracket 54.

As best determined by reference to FIG. 2, rotation of the attached members 72, 74 is limited by the edges 84 of a window opening in the tubular sleeve 66. Note the broken lines in FIG. 2 which illustrate the rightward and leftward limits of rotation. As with outer sleeve 66, the inner sleeve 70 also has window edges 86 to permit the aforedescribed rotation.

As best seen in FIG. 4, the tubular sleeve 66 also has slot 88 formed in one end edge portion. This slot allows the depending leg portion 82' of the U-shaped member to pass through the end and into the tubular sleeve during assembly of the mount.

As indicated in the previous paragraph, mounting device 52 is assembled by sliding rubber member 72 into the tubular member 66. Sleeve 70 encircles rubber member 72 and reduces friction during assembly. An elongated hollow space 90 is formed in the rubber member 72 to allow the rubber to move or "flow" slightly as compression forces are applied to the member.

It can be appreciated that during the assembly of the engine/transmission 10 to the vehicle and particularly to the cross frame 44, a fairly large angulation occurs between the engine/transmission and the vehicle. Basically, this angulation is in a plane normal to the cross frame 44 and along the vehicle's longitudinal dimension, at least in a North-South and installation. Also, during subsequent vehicle operation, there can be a significant angulations between the engine/transmission and the frame. The subject mounting device easily accomodates such angulations.

Although one embodiment of the invention is illustrated and described in detail above, it should be clear that modifications to the device may occur without the resultant structure falling outside the scope of the invention as claimed hereafter.

I claim:

1. To support a transmission portion of an elongated engine/transmission assembly with respect to a vehicle frame, a mounting device capable of significant rotation to accommodate angular rotations of the elongated engine/transmission assembly with respect to the vehicle frame in an angulation plane along the longitudinal dimension of the elongated engine/transmission, comprising: an elongated first bracket member with opposite end portions adopted to be attached to the vehicle frame, a midportion between the end portions of the first bracket having a semi-cylindrical configuration; a tubular sleeve member attached to the semi-cylindrical midportion of the first bracket member and having an axis extending normally to the engine/transmission's angulation plane, the tubular sleeve member having an opening defining a window therethrough; a rubber isolator member within the tubular sleeve so that significant rotation thereof is permitted; an elongated second bracket member with opposite end portions adapted to be attached to the transmission portion of the engine/transmission assembly, a midportion of the second bracket member having a depending leg portion extending therefrom through the window; the rubber isolation member being mold formed to the leg portion so that the second bracket member and the isolator move together as the isolator rotates in the tubular sleeve and the leg portion moves in the window.

2. The mounting device set forth in claim 1 in which the window opening defines opposite edge portions which act as limits for the movement of the leg portion in the window thereby also limiting rotation of the isolator and second bracket.

3. The mounting device set forth in claim 1 and axially oriented slot means in the tubular sleeve sufficient to permit passage of the leg portion as the rubber isolator is moved axially into the tubular sleeve during assembly of the mount.

4. In a vehicle having a cross frame member and an elongated engine/transmission assembly with the transmission portion thereof extending in close proximity to the cross frame member, a mounting device to attach the transmission portion to the cross frame member in a manner to accommodate significant angular rotation of the engine/transmission relative to the cross frame which angulation occurs in a plane extending longitudinally through the elongated engine/transmission, comprising: an elongated first bracket member with end portions and a midportion, the end portions adapted to be attached to the cross frame member, the midportion having a semi-cylindrical configuration; a cylindrical tubular sleeve member attached to the semi-cylindrical midportion so that its axis extends normally to the angulation plane of the engine/transmission assembly, the tubular sleeve having an opening defining a window therethrough; a generally cylindrical rubber isolator member within the tubular sleeve configured so that it can rotate therein about the sleeve's axis; an elongated second bracket member with end portions and a midportion, the end portions adapted to be attached to the transmission portion of the engine/transmission assembly and the midportion of the second bracket member having a depending leg portion extending therefrom through the window; the rubber isolator member being mold formed to the leg portion so that the second bracket member and the isolator member move together as the isolator rotates in the tubular sleeve and the leg portion moves in the window.

5. The mounting device set forth in claim 4 including a thin anti-friction sleeve located between the tubular sleeve member and the rubber isolator member.

* * * * *